Oct. 11, 1966        A. G. McCULLOCH        3,277,770
                    MASONRY ANCHOR BOLT
Filed May 14, 1965                          2 Sheets-Sheet 1
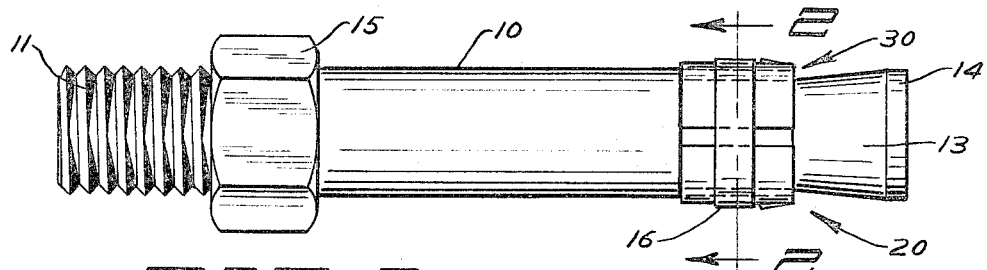
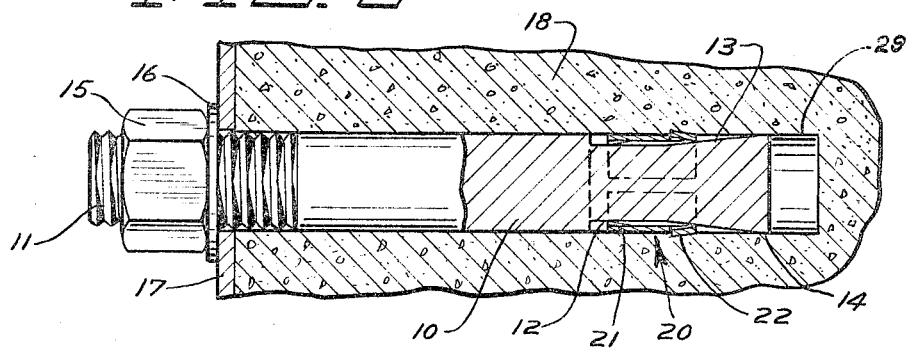
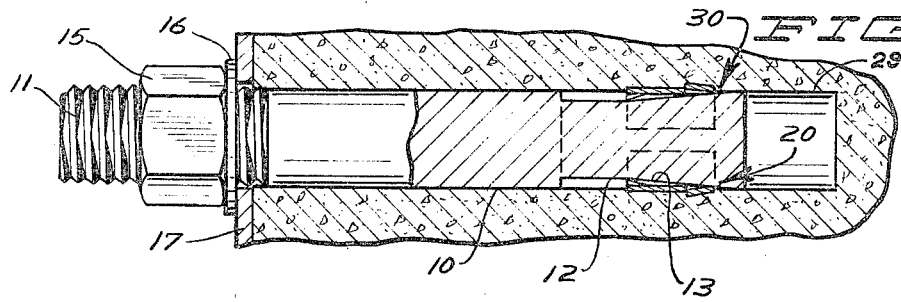
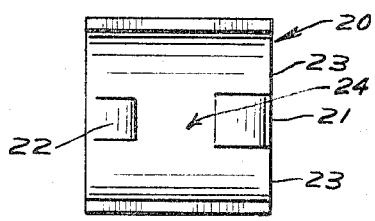
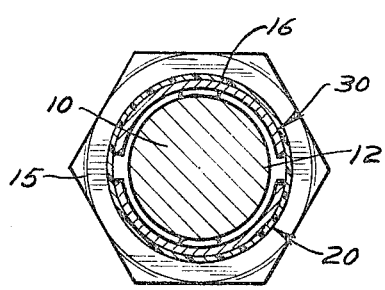
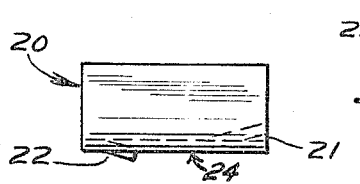
INVENTOR.
ALLAN G. McCULLOCH
BY
Carlsen, Carlsen & Sturm
ATTORNEYS

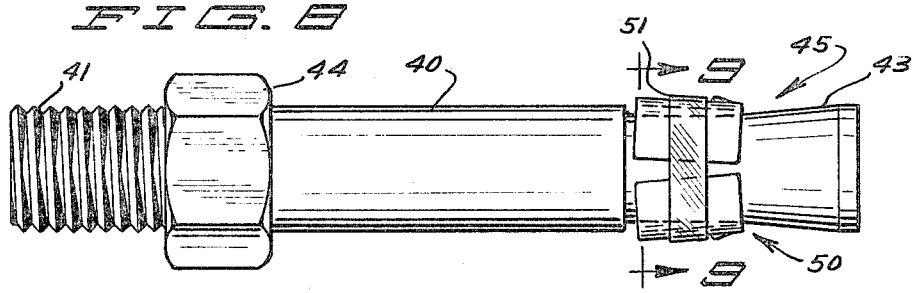
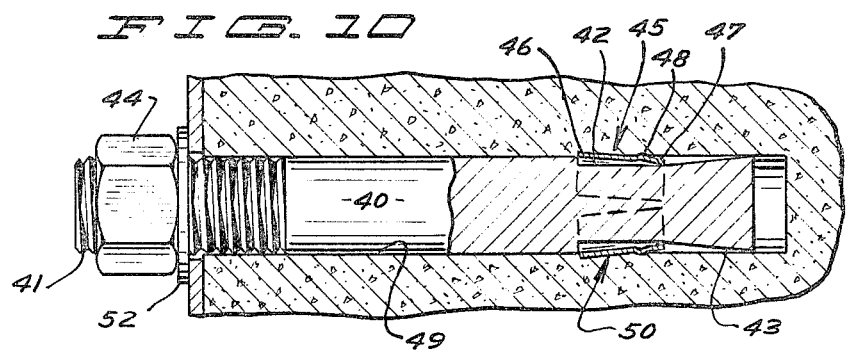
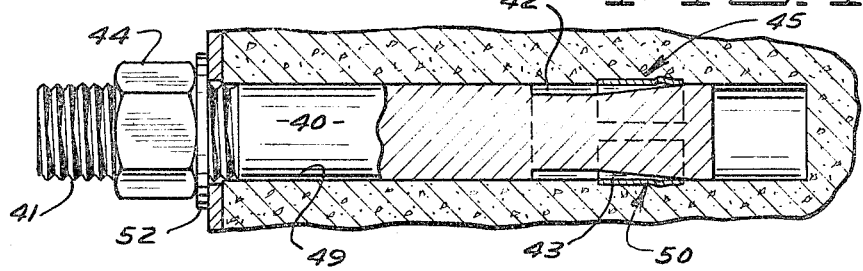
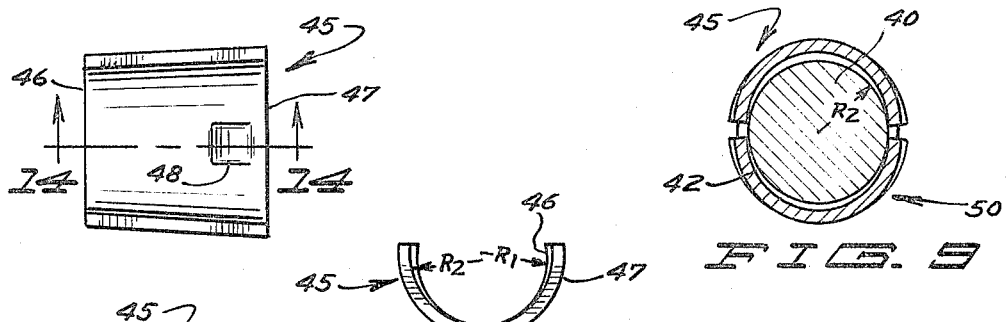
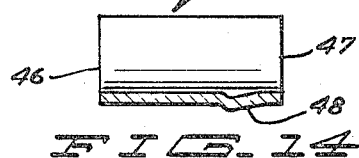
INVENTOR.
ALLAN G. McCULLOCH
BY
Carlson, Carlson & Sturm
ATTORNEYS United States Patent Office 3,277,770
Patented Oct. 11, 1966

3,277,770
MASONRY ANCHOR BOLT
Allan G. McCulloch, Wayzata, Minn. (% Langford Company, 1125 S. Washington Ave., Minneapolis, Minn. 55415)
Filed May 14, 1965, Ser. No. 458,830
7 Claims. (Cl. 85—67)

This is a continuation-in-part of a certain application for United States Letters Patent, Serial No. 412,617, filed November 20, 1964, in the name of Allen G. McCulloch, for Masonry Anchor Bolt, which is now abandoned.

This invention relates generally to fasteners and is more particularly directed to anchor fasteners of the class that are adapted to be inserted into a receptacle therefor and to be firmly held therein by the coaction of an expansible portion of the fastener with the receptacle in which it is positioned.

The prior art with which my invention is concerned is replete with numerous devices adapted to be anchored in receptacles in, for example, masonry in which suitable holes are drilled and various implements inserted therein to tend to hold a bolt, or the like, in the receptacle, or hole. In one class of such devices, a relatively large hole, or receptacle, must be drilled in the material into which an anchor is to be placed and an expansible shield is disposed in the receptacle before the anchor is placed therein and action of the anchor inserted in the shield serves to provide a measure of resistance to withdrawal of the anchor and the shield from the hole. In other devices of this general class, complicated and expensive means are provided to expansibly anchor a member, such as a bolt, in a receptacle provided therefor.

As will become apparent from a consideration of the description set forth below, I have provided an improved anchor fastener which utilizes a wedging, expansion principle through the conjoint cooperation of several simple and inexpensive elements.

It is therefore an object of my invention to provide a novel and improve anchor fastener.

It is a further object of my invention to provide a novel anchor fastener having improved performance.

Another object of my invention is to provide a novel and improved anchor fastener which is easier to insert into receptacles therefor.

A further object of my invention is to provide a novel and improved anchor fastener which is easy to install, simple in operation and inexpensive to manufacture.

A still further object of my invention is to provide an improved anchor fastener having increased tensile fastening properties.

These and other objects of my invention will become apparent from a consideration of the appended specification, claims and drawings, in which FIG. 1 is a side elevational view of an assembled anchor-fastener embodying the principles of my invention;

FIG. 2 is a sectional view taken along section lines 2—2 on FIG. 1;

FIG. 3 is a side elevational view, partly in section, showing an anchor-fastener embodying the principles of my invention after initial insertion into a receptacle therefor;

FIG. 4 is a view showing the device illustrated in FIG. 3 after the anchor-fastener has been securely positioned in a receptacle therefor;

FIG. 5 is a top view of an illustrative embodiment of one of the elements of my invention;

FIG. 6 is a side view of the element shown in FIG. 5;

FIG. 7 is a side elevational view of the element shown in FIG. 5;

FIG. 8 is a side elevational view of a further embodiment of my invention;

FIG. 9 is a sectional view taken along section lines 9—9 on FIG. 8;

FIG. 10 is a side elevational view, partly in section, of the embodiment of FIG. 8;

FIG. 11 is a side elevational view, partly in section, showing the embodiment of FIGS. 8 and 10 in operative disposition;

FIG. 12 is a top view of one of the elements of FIGS. 8 through 11 shown in an enlarged scale;

FIG. 13 is a side view of the element shown in FIG. 12; and

FIG. 14 is a side sectional elevation view taken along section lines 14—14 in FIG. 12.

Referring now to the dawings in which like elements have been identified by like reference characters, there is shown in FIG. 1, a cylindrical body member 10 having a threaded portion 11 and a nut 15 at its left-hand end, a portion of reduced diameter, 12, intermediate its ends and a tapered portion 13 that tapers gradually from the portion of reduced diameter, 12, toward the right end 14 that is adapted to be inserted into a suitable receptacle therefor. A pair of band segments 20 and 30 are shown disposed on the portion of reduced diameter, 12, and are held in position by a band of suitable resilient material 16, for example, soft plastic.

In the illustrated embodiment, and particularly shown in FIGS. 5, 6 and 7, each of a plurality of band segments members, indicated generally by reference characters 20 and 30, may be comprised of a longitudinally elongated arcuately shaped member having an outwardly extending ear portion 22 and an inwardly extending ear portion 21 disposed toward the threaded end of body member 10. The radius of band segments 20 and 30 may preferably be greater than the radius of the reduced portion 12 of body member 10 and the band segment members may be comprised of material exhibiting spring-like characteristics to provide an outward biasing force in the areas indicated generally by reference numerals 23 when inwardly extending ear portion 21 is in engagement with either the portion of reduced cross section 12 or tapered portion 13 on body member 10. It may be noted that the thickness of the band segments is substantially equal to the depth of the portion of reduced diameter with respect to the general diameter of body member 10. It may further be noted that the circumferential dimension of band segments 20 and 30 is such as to allow compression thereof inwardly toward the portion of reduced diameter, 12, on body member 10.

It may be recognized by those skilled in the art upon becoming familiar with the principles of my invention, that the illustrative embodiment may be modified in a number of ways without departing from the spirit of my invention. For example, a plurality of band segments, for example three, may be utilized to provide the same improved performance and characteristics obtained with the pair of band segments used for purposes of illustration. It may further be noted that the band segments holding member 16 may also be comprised of a washer-like member that will remain at the surface of a receptacle upon insertion of the anchor-fastener thereinto.

In FIGS. 3 and 4 a broken-away portion of, for example, a masonry wall, is shown provided with a receptacle 29 that has been provided by suitable methods, for example drilling and the like. The diameter of receptacle 29 is preferably substantially that of cylindrical body member 10. As illustrated in FIG. 3, body member 10 having band segments 20 and 30 disposed on portion 12 may easily be inserted through a member 17 to be fastened to the surface of masonry 18 and into receptacle 29.

During the insertion step, band segments 20 and 30 are maintained disposed on portion 12 by the walls of receptacle 29 and are prevented from movement to the left past the portion of reduced diameter by engagement with the shoulder formed in body member 10. The outer portions of band segments 20 and 30 are easily movable toward the right but will tend to engage the sides of the receptacle upon movement of body member 10 toward the left under, for example, a force exerted longitudinally toward the left by tightening nut 15 on threaded portion 11. Initial engagement of the outer portions of the band segments allows relative movement of body member 10 out of receptacle 29 whereby the tapered portion 13 engages the right ends of the band segments to provide a radially outward force to embed the band segments in the walls of receptacle 29 to provide a firm anchoring engagement therewith and to prevent complete withdrawal of body member 10.

It may be noted in the illustrated embodiment that the outwardly extending rib portions, or ears, 22 on band segments 20 and 30 will tend to resist withdrawal of the band segments when inserted in receptacle engaging position and further will tend to resist rotation thereof. Inwardly extending ears 21 will engage the shoulder on body member 10 to facilitate insertion into a receptacle of somewhat larger diameter. As described above, inwardly extending ears 21 also provide an outwardly directed biasing force to the band segment members through the spring action indicated generally in the areas denoted by reference characters 23 and also in a further area indicated generally by reference character 24.

Referring now to FIGS. 8 through 14 of the drawings, a modification of the embodiment shown and described above is shown as comprised of a generally cylindrical body member 40 having a suitable threaded portion 41 at its front end and being adapted to being inserted into a receptacle for coaction therewith in the manner generally described above. Cylindrical body 40 also is provided with a necked down portion of reduced radius, $R_2$, intermediate its front and rear ends which is disposed adjacent to a tapered portion 43 which is of gradually increasing radius from the rear end of the necked down portion toward the rear end of cylindrical body member 40. In FIG. 8 a nut 44 is shown disposed on threads 41 and a pair of band segments 45 and 50 are shown disposed on necked down portion 42 of cylindrical body member 40. Band segments 45 and 50 are held in the relationship illustrated on FIG. 8 by the use of a band member 51 which may correspond generally to band member 16 on FIG. 1 of the drawings.

Referring to FIGS. 12, 13 and 14, wherein band member 45 is shown on an enlarged scale, band member 45 may be seen to have a front end 46, a rear end 47 and an outwardly extending ear portion 48. Front end 46 on band member 45 may preferably have a radius, $R_1$, that is less than the radius, $R_2$, of the necked down portion 42 on cylindrical body member 40. The rear end 47 of band segment 45 preferably has a radius, $R_2$, that is substantially equal to the radius, $R_2$, of the necked down portion 42 on cylindrical body member 40. The sum of the radial dimensions of each of the plurality of band segment members should be understood to be less than the radial dimension of the necked down portion, 42, on cylindrical body member 40 whereby the relationship shown in FIGS. 8, 9, 10 and 14 is obtained with the individual band segments lying in radially spaced relationship. The thickness of band segment members 45 and 50 may preferably be equal to, or less than, the difference between the radius of cylindrical body member 40 and the radius, $R_2$, of the necked down portion 42. Further, band segment members 45 and 50 are preferably comprised of material exhibiting substantial resilience and spring-like characteristics.

The operation of the apparatus shown in FIGS. 8 to 14 is substantially similar to that described above in connection with FIGS. 1 to 7. A receptacle, or hole, 49, is provided in masonry or the like in which an anchor fastener is to be disposed. The diameter of the receptacle 49 is substantially that of cylindrical body member 40. In FIG. 10 of the drawings, a washer member 52 is shown disposed intermediate nut 44 on threaded portion 41 of cylindrical body member 40. While not shown on the drawings, it may be appreciated that washer member 52 might be utilized as a replacement for the band member 51 (FIG. 8) and that in the process of inserting the assembled anchor-fastener into receptacle 49, washer 52 is displaced axially thereon and will assume the position shown in FIG. 10 of the drawings. Further, in FIG. 10, the front ends 46 of band members 45 and 50 are shown extending slightly outwardly of necked down portion 42 on cylindrical body member 40. This may be somewhat exaggerated but is shown to indicate clearly that an outwardly directed spring biasing force is present by virtue of the relationship between the diameter of front end 46 on band segment member 45 and the radius $R_2$ of necked down portion 42. It may be appreciated that relative axial movement between band segment members 45 and 50 and cylindrical body member 40 is prevented through engagement of the front ends of the band segment members with the shoulder present on the cylindrical body member 40 at the front end of necked down portion 42 thereon. The engagement of the outer front ends of band segment members 45 and 50 with the walls of receptacle 49 tends to retain the band segment members in substantially stationary position with respect to receptacle 49. Additionally, the engagement of the upset ears 48 on the band segments provides further engagement with the walls of receptacle 49 to provide increased tendency to resist movement toward the left of the drawings.

FIG. 11 shows the relationship between the elements of my invention following the exertion of a longitudinal force toward the right on cylindrical body member 40 by the application of suitable torque to nut 44 on threaded portion 41. The tendency of band segment members 45 and 50 to remain stationary, in combination with the outward force provided from tapered portion 43 on cylindrical body member 40, results in a certain amount of radially outwardly displacement of band segment members 45 and 50 to firmly embed them in the walls of receptacle 49 and thereby securely retain cylindrical body member 40 therewithin. It is believed that the spring-like, resilient characteristics of the front ends of band segments 45 and 50 will present a constant outwardly directed force to compensate for wear on the walls of receptacle 49 due to vibration and the like.

In one functional, operative embodiment of my invention, body member 10 was comprised of 1144 steel in which the largest diameter was .750 inch and the portion of reduced diameter 12 was .608 inch. The longitudinal dimension of portion 12 was .675 inch and the longitudinal dimension of tapered portion 13 was .570 inch to provide a taper of approximately 7 degrees. It may be noted at this point that the portion of reduced diameter 12 is substantially equal to the root diameter of threaded portion 11 of body member 10. The band segments were formed of 1075 sheet steel 0.65 inch thick that were heated, quenched and drawn to provide suitable spring characteristics.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An anchor-fastener comprising, in combination:
   (a) a cylindrical body member having means on the front end thereof for providing a longitudinal force tending to withdraw said body member from a receptacle therefor, said body member also having an axially extending portion of reduced radius intermediate the ends thereof and an outwardly flaring portion intermediate said portion of reduced radius and the rear end thereof;

(b) a plurality of resilient segment members of substantially constant thickness and a length substantially equal to the length of the portion of reduced radius on said body member and slidably disposed thereon, said segment members also having (1) a substantially constant radius of curvature larger than the radius of said portion of reduced radius, and (2) inwardly extending biasing means disposed in proximity to the front ends thereof, said segment members being operable, upon insertion of the body member and segments into a receptacle therefor, to be compressed into a portion of reduced radius and to provide a substantial outwardly directed receptacle wall engaging biasing force; and (c) means for holding said segments on the reduced portion of said body member prior to insertion of said body member into a receptacle therefor.

2. The subject matter of claim 1 in which the thickness of the segment members is substantially equal to the depth of the portion of reduced radius.

3. The subject matter of claim 1 in which the length of the segment members is greater than the axial length of the portion of reduced radius on the body member.

4. An anchor-fastener comprising, in combination:

(a) a cylindrical body member having means on the front end thereof for providing a longitudinal force tending to withdraw said body member from a receptacle therefor, said body member also having an axially extending portion of reduced radius intermediate the ends thereof and an outwardly flaring portion intermediate said portion of reduced radius and the rear end thereof;

(b) a plurality of resilient segment members of substantially constant thickness and a length substantially equal to the length of the portion of reduced radius on said body member and slidably disposed thereon, said segment members also having (1) a radius of curvature at the front ends thereof that is smaller than the radius of the portion of reduced radius on said body member and a radius of curvature at the rear ends thereof that is substantially the same as said portion of reduced radius, said segment members being operable, upon insertion of the body member and segments into a receptacle therefor, to be compressed into a portion of reduced radius and to provide a substantial outwardly directed receptacle wall engaging biasing force; and (c) means for holding said segments on the reduced portion of said body member prior to insertion of said body member into a receptacle therefor.

5. The subject matter of claim 4 in which the thickness of the segment members is substantially equal to the depth of the portion of reduced radius.

6. The subject matter of claim 4 in which the length of the segment members is greater than the axial length of the portion of reduced radius on the body member.

7. The subject matter of claim 6 in which an outwardly extending receptacle wall engaging ears is disposed in proximity to the rear ends on each of the segment members.

References Cited by the Examiner

UNITED STATES PATENTS

| 631,765 | 8/1899 | Burk | 85—69 |
| 2,013,488 | 9/1935 | Carrier | 287—20.3 |
| 2,859,056 | 11/1958 | Marks | 287—20.3 |
| 2,873,454 | 2/1959 | Phillips | 287—20.3 |
| 3,107,569 | 10/1963 | Lerick | 85—79 |
| 3,175,455 | 3/1965 | Reddy | 85—75 |

FOREIGN PATENTS

| 223,908 | 12/1957 | Australia. |
| 44,448 | 10/1954 | France. |
| 459,994 | 5/1928 | Germany. |

CARL W. TOMLIN, *Primary Examiner.*

M. PARSONS, JR., *Assistant Examiner.*